United States Patent
Underwood et al.

(10) Patent No.: US 10,824,468 B2
(45) Date of Patent: Nov. 3, 2020

(54) CONTROL OF INSTRUCTION EXECUTION IN A DATA PROCESSOR

(71) Applicant: Arm Limited, Cambridge (GB)

(72) Inventors: Mark Underwood, Cambridge (GB); Sandeep Kakarlapudi, Trondheim (NO); Robert John Rees, Cambridge (GB)

(73) Assignee: Arm Limited, Cambridge (GB)

( * ) Notice: Subject to any disclaimer, the term of this patent is extended or adjusted under 35 U.S.C. 154(b) by 101 days.

(21) Appl. No.: 16/273,448

(22) Filed: Feb. 12, 2019

(65) Prior Publication Data

US 2020/0257555 A1 Aug. 13, 2020

(51) Int. Cl.
*G06F 9/46* (2006.01)
*G06F 9/48* (2006.01)
*G06F 12/0837* (2016.01)
*G06F 9/38* (2018.01)
*G06F 9/52* (2006.01)

(52) U.S. Cl.
CPC .......... *G06F 9/4881* (2013.01); *G06F 9/3877* (2013.01); *G06F 9/522* (2013.01); *G06F 12/0837* (2013.01)

(58) Field of Classification Search
CPC ...... G06F 9/4881; G06F 9/522; G06F 9/3877; G06F 12/0837
See application file for complete search history.

(56) References Cited

U.S. PATENT DOCUMENTS

| | | | | |
|---|---|---|---|---|
| 5,548,795 A | * | 8/1996 | Au | G06F 3/0601 710/3 |
| 6,389,587 B1 | * | 5/2002 | Lewis | G06F 9/4494 717/151 |
| 6,708,267 B1 | * | 3/2004 | Flacks | G06F 9/3838 712/216 |
| 10,228,869 B1 | * | 3/2019 | Nakibly | G06F 9/5038 |
| 10,649,780 B2 | * | 5/2020 | Sleiman | G06F 9/3836 |
| 2012/0204004 A1 | * | 8/2012 | Dockser | G06F 9/3814 712/205 |
| 2012/0204005 A1 | * | 8/2012 | Dockser | G06F 9/382 712/205 |
| 2012/0204008 A1 | * | 8/2012 | Dockser | G06F 9/382 712/208 |
| 2013/0282657 A1 | * | 10/2013 | Besen | G06F 16/1844 707/625 |
| 2015/0277925 A1 | * | 10/2015 | Sleiman | G06F 9/30098 712/215 |
| 2017/0109172 A1 | * | 4/2017 | Sleiman | G06F 9/3851 |

* cited by examiner

Primary Examiner — Adam Lee
(74) Attorney, Agent, or Firm — Vierra Magen Marcus LLP

(57) ABSTRACT

A method of controlling a data processor to perform data processing operations is disclosed in which a host processor prepares one or more queue(s) of operations for execution by the data processor. When an error is encountered in the processing of an operation for one of the one or more queue(s), a queue can be set into an error state in which instructions that may have a data dependency on another operation are not executed. The host processor includes in the queues error barrier instructions that divide the respective queues into sets of operations between which there are no data processing dependencies. An error state for a queue can thus be cleared when its processing reaches the next error barrier instruction in the queue.

17 Claims, 5 Drawing Sheets

CONTROL OF INSTRUCTION EXECUTION IN A DATA PROCESSOR

BACKGROUND

The technology described herein relates to a method of and apparatus for controlling the execution of instructions by data processors, and in particular to a mechanism for handling errors within streams of instructions.

Many data processing systems include processing resources, such as a graphics processing unit (GPU) or a video processor (VPU), which may perform processing work on request for applications that are executing on a main processor (CPU) of the data processing system. For instance, many electronic devices, such as mobile phones or tablets, will include both a host processor (CPU) that executes an operating system, such as Android, capable of running various applications and one or more dedicated data processor(s) (accelerator(s)), such as a GPU, that provide hardware support for specific functions. In the case of a mobile phone or tablet, for example, the GPU may be used to generate the user interface that is displayed under the control of the operating system, and to compose the frame that is displayed on the display to the user.

In such systems, the data processor may be caused to perform processing work for applications executing on the host processor by the host processor providing to the data processor instructions specifying the processing work to be performed. The data processor thus includes a number of programmable processing units and/or stages that are operable to execute programs comprising sequences of instructions provided from the host processor in order to perform the desired processing operations. The instructions may be to perform, or instruct hardware units to perform, actual data processing operations, such as in the case of a graphics processor instructing a hardware unit to execute a shader program (e.g. via a "RUN" command). In other cases, an instruction may be to control the operation (or flow) of the data processor, for example in the case of setting up state which could persist across a number of data processing operations.

When submitting processing work to the data processor, the host processor thus builds suitable operations (e.g. in the form of a set of one or more instructions) to be executed by the data processor, and the operations are then provided to the data processor for execution. For instance, an operation that is to be executed by the data processor may typically be built by the host processor using a suitable driver for the data processor.

So as to remove 'bubbles' of inactivity which would otherwise occur if operations were to be built at the host processor and submitted to and then executed by a data processor such as a GPU in a strictly serial fashion, e.g. as illustrated schematically in FIG. 1, a host processor may typically build sequences of operations in a pipelined fashion, e.g. as illustrated in FIG. 2, such that at a particular instant in time there will be a sequence or sequences of operations (e.g. a command stream) queued for the data processor to execute.

Correspondingly, a data processor when operating under the control of a host processor in this way will have access to one or more queue(s) to which operations prepared by the host processor are submitted (queued) for execution, with the host application and the driver building and submitting work to the queue(s) some distance ahead of where the data processor is currently executing from the queue(s).

Although FIG. 2 shows the execution stages of the data processor, which in this example is a GPU, being only one operation behind the building stage in the host processor, it will be appreciated that in practice the gap can be, and typically is, larger than this. For example, in the case of a graphics processor, the host processor may build operations for frames that are three or more operations ahead of the frame that is currently being generated by the graphics processor.

Operating a data processor in a pipelined fashion wherein processing work for the data processor is queued for execution can thus work well, e.g., to improve the throughput at the data processor. However, the Applicants have recognised that there can still be problems with such arrangements. Accordingly, there remains scope for improvements in the context of the execution of instructions during program execution by a data processor.

BRIEF DESCRIPTION OF THE DRAWINGS

A number of embodiments of the technology described herein will now be described by way of example only and with reference to the accompanying drawings, in which.

DETAILED DESCRIPTION

Figure 1:
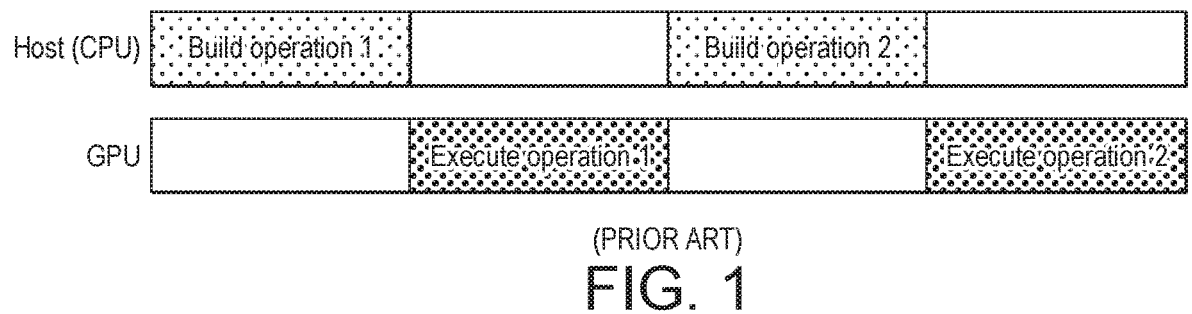
FIG. 1 schematically illustrates an example of operations being prepared by a host processor and executed on a data processor such as a graphics processor in a strictly serial fashion.
Figure 2:
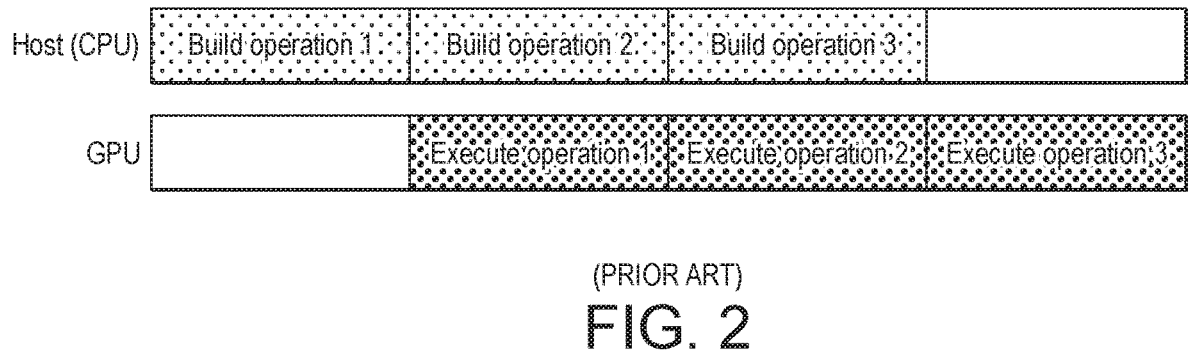
FIG. 2 schematically illustrates an example of operations being prepared by a host processor and executed on a data processor such as a graphics processor in a pipelined fashion.

A first embodiment of the technology described herein comprises a method of controlling a data processor to perform data processing operations, comprising:

preparing at a host processor one or more queue(s) of operations for execution by the data processor, each operation comprising a set of one or more instruction(s), each queue having a normal processing state and an error state, in which error state the data processor does not implement any instructions in the queue that may have a data dependency on another operation in the queue(s) such that those instructions require input data from the processing of the other operation, wherein the preparing the one or more queue(s) of operations includes, including in one or more of the queue(s) one or more error barrier instructions that divide the respective queue(s) into plural sets of operations between which there are no data processing dependencies;

providing the queue(s) of operations to the data processor for execution; and the data processor executing the queue(s) of operations, wherein the executing the queue(s) of operations comprises:

in response to an error in the processing of an operation for one of the one or more queue(s), setting a queue of operations into an error state;

processing the queue of operations in the error state by not executing any instructions that may have a data dependency on another operation;

clearing the error state for the queue when the processing reaches the next error barrier instruction in the queue so that the next operation(s) in that queue can be processed by the data processor in its normal processing state; and resuming the processing of the next operation(s) in the queue in the normal processing state.

A second embodiment of the technology described herein comprises a data processing system, the data processing system comprising a host processor and a data processor that is operable to perform data processing operations under the control of the host processor, wherein:

the host processor comprises:

a driving circuit for preparing one or more queue(s) of operations for execution by the data processor, each operation comprising a set of one or more instruction(s), wherein the driving circuit is configured to include within the one or more queue(s) of operations one or more error barrier instructions that divide the respective queue(s) into plural sets of operations between which there are no data processing dependencies; and wherein the data processor comprises:

an execution unit for executing instructions in the one or more queue(s), the data processor being operable to process a queue in a normal processing state or in an error state, in which error state the data processor does not implement any instructions in the queue that may have a data dependency on another operation in the queue(s) such that those instructions require input data from the processing of the other operation; and an error handling circuit that is operable to set a queue of work items into an error state in response to an error in the processing of a work item for one of the one or more queue(s) so that the queue of work items is processed in the error state, and to then clear the error state for the queue when the execution unit reaches the next error barrier instruction in the queue so that the next work item(s) in the queue can be processed by the execution unit in its normal processing state.

The technology described herein generally relates to data processors for data processing systems wherein the data processor is operable to perform processing work under the control of a host processor, and particularly wherein the host processor builds sequences (queues) of operations that are to be executed by the data processor, e.g. in a pipelined fashion, such that at any instant a sequence of operations (sets of one or more instructions) is queued for the data processor to execute. In other words, the data processor is operable to execute programs comprising one or more sequence(s) (i.e. queues) of operations.

For example, in some embodiments, the data processing system may comprise a command stream-based system, wherein processing work to be executed is specified by a stream or streams of commands (instructions) prepared by the host processor, and wherein the data processor includes a dedicated processing unit, a 'command stream execution unit', for interpreting and implementing these command streams. However, in principle, the technology described herein could be used in any similar data processing arrangement where there may be one or more queue(s) of work to be executed.

Such arrangements wherein processing work for a data processor is submitted to one or more queue(s), e.g. in a pipelined fashion, can generally work well. However, problems can still arise in the case where an error occurs during the execution of an operation in a sequence (queue) on the data processor (e.g., wherein the execution of the operation fails). For instance, there may be various processing dependencies between the operations in a queue. For example, there will generally be an ordering requirement for the processing of the operations as the operations in a queue should be executed in sequence, but there may also be other processing dependencies between the operations (and in general, there may be dependencies between operations within a single queue, and/or between operations in other queues where multiple queues are being executed).

In particular, at least some portions of an operation may require data input from the processing of a prior operation. These can therefore be considered as having a so-called "data dependency" on the prior operation.

Thus, when an error is encountered during the execution of a given operation, i.e. the execution of at least part of the operation fails, this can then mean that any (and all) later operations that have a data dependency upon the operation that encountered the error may then be unable to be (validly) processed. For instance, any future operations that require input data from the operation that encountered the error (as well as any operations depending from those) should not be processed as they may now have an invalid input which could cause further (propagating) errors, and in some cases could even cause a device lockup.

Typically, once the host processor has finished building an operation, and that operation has been queued for execution by the data processor, the host processor will then discard the inputs used to build the operation (e.g. in order to reduce memory requirements), as these inputs are then no longer needed for the normal processing of the operations. That is, once an operation has been built and queued into the data processing pipeline to be executed by the data processor, the operation is then essentially processed locally by the data processor without any underlying knowledge of the inputs used to build the operation, or therefore of the underlying dependencies between operations.

However, this means that if an error is encountered during the processing of an operation, recovery from this situation can be hard (or even impossible) as not only will all currently queued operations need to be abandoned (as it may not be known which future operations required data from the failed operation) but also any and all future operations which are dependent on these.

As such, this can require the discarding and rebuilding of all queued work after the error was encountered, and the application may in such cases need to start again from the beginning, e.g. by removing the driver context that experienced the failure and creating a new driver context.

In principle, it might be possible to try to track data dependencies on failed operations in a more sophisticated manner such that not all queued work has to be abandoned and started again following an error. For example, in parallel with building the operations, suitable data may be created on the host processor side that tracks dependencies between operations and this data can then be associated with operations as they are executing on the data processor.

In this case, if an error is encountered when executing a particular operation, the host processor may then be able to find the associated data and use it to determine dependencies between the failed operation and any yet to be built operations (and potentially also to update the global data processor state which the failed operation would otherwise have done).

However, this approach would require significant extra processing effort at the host processor and potentially also a need to retain significant extra data thereby consuming more memory. Further, as this data is stored only on the host processor, and would not be used during the normal processing operation of the data processor, it can be difficult to validate this data, and there is therefore a risk that the data could be incomplete, or wrong, which could then lead to further issues that would only show up when the execution of an operation fails, and which issues can therefore be difficult to resolve.

The technology described herein provides a better way to handle the occurrence of errors when processing queues of operations.

In the technology described herein, each sequence (queue) of operations for a device (and in an embodiment for all queue-based devices which form part of the system) has an associated "error state" that can be appropriately set and cleared. Thus, when an error is encountered, a queue can be set into its error state, with the processing of the operations in the queue then proceeding in the error state until such time that the error state is cleared and normal processing can resume.

When operating in an error state, the data processor only processes instructions where the execution of those instructions would not be compromised by the error. These instructions are then allowed to continue to be executed as normal (e.g., for a graphics processor, so that the output will continue to render in the desired order). However, in the error state, the data processor does not implement any instructions in the queue that might potentially require input data from the processing of another operation in the queue (or potentially in another queue).

That is, the technology described herein recognises instances where the execution of instructions would not be compromised by the error, and allows these instructions to continue to be processed, whilst preventing any data plane processing that could otherwise lead to error propagation.

For instance, it will be appreciated that the operations in a queue should be processed in sequence. That is, there is generally an ordering requirement (or dependency) on the operations in the queue. An operation which merely requires to be executed after another operation can thus be considered to have an "order dependency". Similarly, an operation which inherits control state from another operation can also be considered to have an "order dependency". These control plane instructions, which can potentially impact not only the operation containing the instruction but potentially all future operations, e.g. a global state change, can, and should, still be executed in the error state, e.g. to allow the processing to continue beyond the error.

However, any data processing instructions, or any other instructions which require input data from another operation in the queue (or indeed from other queues which could be associated with the same data processor, or even a different processor, e.g. the CPU, a display controller, a video decoder, etc.), and which can therefore be considered to have a "data dependency", should not be processed, and accordingly in the technology described herein are not processed when the data processor is operating in an error state, as in the event of an error it cannot be guaranteed that there is a valid data input for these operations.

It will be appreciated that because the operations are prepared by the host processor and then queued (or pipelined) for execution by the data processor, the data processor does not generally have knowledge of any data dependencies between the operations. Thus, in the technology described herein, the processing of any operations that may possibly require input data from another operation, i.e. any data plane operations, is prevented in the error state.

In other words, when a queue is being operated in its error state, any data processing operations (such as 'RUN' instructions) in the queue are in an embodiment treated as 'no operation' (NOP) instructions. This then ensures that the execution of any instructions that may have some data dependency on (i.e. that may require input data to be obtained from the processing of) a prior operation in the (or another) queue is prevented. Thus, in an embodiment, when a queue is set into an error state, only control plane operations (such as synchronisation operations for synchronising the processing operations in different processing queues, or instructions to load external data or state) are executed.

On the other hand, when the queue is not in the error state, and the data processor is executing the queue in its normal processing state, both data processing and control plane operations in the queue can be, and in the technology described herein in an embodiment are, executed.

In this way, by appropriately setting a queue into an error state in which only control plane operations are executed (as opposed to its normal processing state wherein both data processing and control plane operations are executed), it can be ensured that when an error is encountered, any data processing operations that might otherwise be impacted by the error are not processed. The error is thus prevented from propagating, avoiding the problems outlined above. However, it is not necessary in this case to restart the entire program and any operations for which it can be ensured that there is no data dependency on the failed operation can continue to be processed, e.g. so that the program control flow can be maintained and the execution of the program can be continued beyond the error. This means that normal processing can subsequently be resumed, e.g. when any processing dependencies on the failed operation are broken.

To facilitate this operation, the queues are also configured to include "error barrier" instructions (which are in an embodiment included in the queue(s) as they are prepared on the host processor, e.g. by the driver for the data processor). These error barriers are included between sets of operations between which there are no data processing dependencies. The error barriers thus act to divide the queue(s) into plural sets of operations between which there are no data processing dependencies, and which sets can therefore be processed independently (and, e.g., so that a failed operation in a previous set can have no impact on the processing of a later set). For example, often there is a natural break in the dependencies of operations at which point any errors which occurred during the processing of previous operations are no longer relevant. In the case of graphics processing, this may typically be at the end of a render pass or frame (wherein each render pass or frame is being processed independently).

Thus, when building the sequences of operations the host processor (driver) in an embodiment includes within the queue one or more suitable error barrier instructions telling the data processor the locations of the processing breaks within the queue. The error barriers thus provide the data processor with information regarding the processing dependencies between operations that would otherwise not be available to the data processor, and without having to expressly track the dependencies, e.g. by generating additional data on the host processor side.

It will also be appreciated that these error barriers can be included into the queue(s) with relatively minimal additional processing overhead since at the time that the host processor (driver) is building a queue, the host processor (driver) has knowledge of the boundaries and/or dependencies between the sets of operations. Thus, including an appropriate error barrier is merely a matter of the host processor adding a suitable instruction into the queue. However, once these error barriers have been included into the queue, the error barriers (and also the error states) are always local to the data processor so that the host processor does not then need to track or retain this information.

During execution, when an error barrier in a queue is encountered, the queue's error state is returned to normal (to the "non-error" state) (the "error state" of the queue is cleared). Thus if an error is encountered during a data processing part of an operation in the queue, the queue will be set into the error state, and will remain in that state until the next error barrier is encountered, in response to which the queue's error state may be cleared (and the queue will return to normal operation). The inclusion of such error barriers thus provides a relatively easy way for the data processor to be able to reset (clear) the error state for a queue after an error is encountered. The error handling logic in embodiments of the technology described herein can thus be kept relatively simple and does not involve significant additional processing and/or memory.

Because the data processor is able to clear the error state for a queue when the next error barrier is reached, this means that, at worst, when an error is encountered for a given operation, it is only operations in the same set (e.g. a single render pass or frame) that are processed in the error state. The operations for the next set after the error barrier can however be processed as normal as the data processor now has knowledge through the error barrier of the breaks in the processing dependencies and knows that the previously failed operation can have no impact on any operations after the error barrier. So, for example, if an error is encountered during the data processing for a particular frame, so that the frame is then set into its error state and further data processing for that frame is prohibited, the program control flow is continued so that once the error state has been cleared the data processor can continue to render the output for the next frame(s) in the normal processing state.

In this way the impact of any failed operations in a queue can thus be minimised and/or isolated, so that it is no longer necessary to restart the entire processing operation or to explicitly track the dependencies on the host processor side. Accordingly, it can be seen that the technology described herein allows for a more graceful handling of errors within such instruction streams.

A sequence (queue) is in an embodiment set to be in the error state when an error is encountered during the "data processing" part of an operation in the queue. That is, when an error is encountered for an operation in a particular queue, that queue is then set into an error state, and the subsequent operations in the queue are then processed in the error state at least until the next error barrier is reached and the error state can be cleared.

In an embodiment, the setting of a command stream (queue) into the error state can be done selectively. This could be done on the data processor (e.g. GPU) itself, but in an embodiment when a data processing error occurs, that error is sent to the host processor with the host processor then deciding whether to set the queue (command stream) in question to the error state or not. So, in embodiments, in response to an error in the processing of an operation in the queue, an error signal is generated, and the setting of the queue of operations into the error state is performed selectively based on a response to the error signal. In particular, the error signal may be generated and submitted to the host processor, with the host processor then provided a response as to whether or not to set the error state. (For instance, in some cases, e.g. if the error is non-recoverable, e.g. when an error occurs when executing part of the control flow, the host processor may decide not to set the error state and instead to simply restart the processing from the beginning.)

However, it is also contemplated that the setting of a command stream (queue) into the error state can be done automatically by the data processor, whenever an error is encountered, i.e. without any decision from the host processor on whether or not to set the error state.

Often, a plurality of queues will be being executed, and as mentioned above, there may also be data and other processing dependencies between different queues. These may be different queues on the same data processor (e.g. a geometry processing queue and a fragment processing queue on a graphics processor), or may be different queues on a different processor (e.g., the CPU, a display controller, a video decoder, etc.). For example, in the context of graphics processing, the graphics processor may execute parallel geometry processing and fragment processing queues with the fragment processing queue waiting on input data from the geometry processing operations. In that case, the geometry processing queue may perform various operations to generate the required geometry data for input to the fragment processing queue so that the fragment processing queue has a data (and order) dependency on the geometry processing queue.

A synchronisation mechanism is thus in an embodiment provided between the different processing queues. For example, the fragment processing queue may be operated to wait until the geometry processing queue has completed as set of required operations, at which point the geometry processing queue may implement a suitable (synchronisation) operation to inform the fragment processing queue that the geometry data is available, and to cause the fragment processing queue to start processing this data.

In such cases, to avoid potential error propagation between different queues, a mechanism is in an embodiment provided to allow error states to be propagated between different queues for which there may be some data dependency. In this way, if an error is encountered during the execution of an operation in a first queue, and the first queue is accordingly set into its error state, this information may then be conveyed to other queue(s) such that any other queue(s) that may have a data dependency on the first queue can also be set into an error state, if desired, e.g. to ensure that the error in the first queue does not result in an invalid input for the processing in the other queue(s). So, the other queue(s) may "inherit" an error state from another queue. A queue can thus be set into an error state in response to receiving an indication that another queue is in an error state. In an embodiment, the error state for a queue may be inherited through a synchronisation operation from another queue that is in an error state. A queue being in an error state can thus also be propagated to other queues that may have dependencies on the data processing part of the queue that has entered the error state. This is in an embodiment done through a modification to the existing synchronisation operations between the queues (which signal, for example, to indicate that a particular piece of work has been completed by one queue to other queues that are waiting for that piece of work to be completed before continuing their processing, as described above).

That is, in an embodiment, a synchronisation indication command can be configured to also propagate with it the fact that the current queue that is sending the synchronisation signal is in the error state or not. Correspondingly, a queue that is waiting for a synchronisation signal in an embodiment can be configured to inherit the error state in the synchronisation signal (if the synchronisation signal is propagating the error state from a queue) or not.

For example, where the current queue that is sending the synchronisation signal is in the error state, the synchronisation indication command can tell the waiting queue that it should also execute in the error state. That is, by the host processor including suitable instructions in the queue, the queue that executes the synchronisation indication command can not only inform the waiting queue that it is in the error state, but also propagate the error state to the waiting queue so that the waiting queue also then executes in the error state. Alternatively, the propagation of the error state may be controlled using a suitable instruction in the waiting queue. For instance, until the current queue executes the appropriate synchronisation indication command, the waiting queue may be executing a 'wait' operation, where processing is paused pending the required data from the current queue. The wait operation may then include information telling the waiting queue whether or not to inherit an error state from another queue. For instance, the wait operation may tell the waiting queue to execute in the error state whenever it receives a synchronisation signal indicating that the queue upon which it is waiting is in the error state.

This then allows the propagation/inheritance of error states between queues to be carried out in a selective manner using the queue synchronisation mechanism. Again, this in an embodiment involves minimal additional processing as the error propagation can be handled by simply modifying the queue synchronisation instructions that would already be present in the queues to include a suitable indication. This can readily be done at the host processor when building the operations.

So, if an error encountered in one (a first) queue is desired to control the execution mode in another queue, e.g. because the other queue has a data dependency on the first queue, the synchronisation mechanism can in embodiments be set to allow this information to be conveyed to the dependent queue when the synchronisation mechanism is signalled from the first queue so that the dependant queue can have its error state set accordingly based on the error state of the first queue. On the other hand, if an error encountered in the first queue is not desired to control the execution mode in the other queue, e.g. because there is no data dependency, the synchronisation mechanism can be set so the error state of the first queue is not conveyed.

It is possible that there may be multiple secondary queues waiting on the processing of the first queue, and the secondary queues may have a mixture of data dependencies and order only dependencies. In that case, in embodiments, the first queue when signalling the synchronisation mechanism may communicate its error state to each of the secondary queues, and each secondary queue can then use the synchronisation mechanism to either set the error state of the queue based on the error state from the first queue or leave it unmodified.

Thus, in embodiments, the program that is being executed by the data processor may include at least a first queue and a second queue, wherein the second queue has to wait upon the processing of the first queue, the method comprising setting the second queue into an error state in response to receiving an indication that the first queue is in its error state. In that case, the first queue may include a synchronisation signal instruction for signalling the second queue to start processing, and wherein the indication to set the queue of operations into the error state is provided using the synchronisation signal.

Similar synchronisation mechanisms may be employed in the same way for queues operating on different processors.

The host processor in an embodiment determines when building the queues whether for any synchronisation operation in a queue the error state of the queue should be propagated, and/or whether the error state of another queue should be inherited by the queue in question. This may be based, for example, upon whether the queue that encounters the error state will affect the operation of other queues, or where, for example, plural queues are waiting on the same queue, but only some of those plural queues need to inherit the error state.

Thus the host processor in an embodiment sets the propagation/inheritance of the error state between the different queues (command streams). The propagation/inheritance of the error state between the different queues can thus be selectively determined by the host processor when the operations are being prepared and queued.

Any reset (clearing) of the error state of a queue (command stream) is in an embodiment done individually per queue in response to an "error barrier" in the queue in question (i.e. there is not the same mechanism of potentially propagating an "error clear" through to other queues). That is, once a queue has been set into its error state (whether this is due to encountering an error in that queue, or the error state being inherited from another queue), that queue in an embodiment then remains in its error state until the next error barrier instruction in that queue is processed.

In further embodiments the technology described herein also extends to methods of operating a data processor and data processors as such that may operate within a data processing system as described herein according to any embodiment(s) of the technology described herein. That is, the methods and data processors according to these further embodiments may comprise any features described above in relation to the other embodiments at least to the extent that they are not mutually exclusive.

A third embodiment of the technology described herein comprises a method of operating a data processor when executing operations from one or more queue(s), each operation comprising a set of one or more instruction(s), wherein each queue of operations includes one or more error barrier instructions dividing the queue into plural sets of operations between which there are no data processing dependencies, and wherein the data processor is operable to set a queue of operations into an error state in response to an error in the processing of an operation for one of the one or more queue(s), in which error state the data processor does not implement any instructions in the queue that may have a data dependency on another operation in the queue(s) such that those instructions require input data from the processing of the other operation, the method comprising:

setting a queue of operations into an error state;

processing the queue of operations in the error state by not executing any instructions that may have a data dependency on another operation;

clearing the error state for the queue when the processing reaches the next error barrier instruction in the queue so that the next operation(s) in that queue can be processed by the data processor in its normal processing state; and resuming the processing of the next operation(s) in the queue in the normal processing state.

A fourth embodiment of the technology described herein comprises a data processor, the data processor comprising:

an execution unit for executing operations from one or more queue(s); and an error handling circuit that is operable to set a queue of operations into an error state in response to an error in the processing of an operation for one of the one or more queue(s), in which error state the data processor when executing the operations in a queue does not implement any instructions in the queue that may have a data dependency on another operation in the queue(s) such that those instructions require input data from the processing of the other operation, the data processor being configured such that:

when the execution unit is executing operations from the one or more queue(s), each operation comprising a set of one or more instruction(s), and each queue of operations including one or more error barrier instructions dividing the queue into plural sets of operations between which there are no data processing dependencies, the error handling circuit is configured to:

in response to an error in the processing of an operation for one of the one or more queue(s), set a queue of operations into an error state so that the queue of operations is processed in the error state, and to then clear the error state for the queue when the execution unit reaches the next error barrier instruction in the queue so that the next operation(s) in the queue can be processed by the execution unit in its normal processing state.

The data processor, and data processing systems, that the technology described herein is used in can be or include any suitable and desired data processor that includes an execution unit operable to execute programs. In an embodiment, the data processor is a graphics processor (graphics processing unit (GPU)), but it could also be other forms of processor, such as a CPU, display processor, video processor, an image signal processor (ISP), a digital signal processor (DSP), etc., if desired.

Data processors that are operable to execute programs will include an appropriate execution unit or units operable to execute instructions in a program to be executed. The execution unit will include, for example, appropriate instruction fetch and decode circuits (or circuitry), and be operable to generate control signals for one or more associated hardware units (functional units) for directly (natively) executing instructions in a program. The execution unit may also have an associated more general processing unit, such as a microcontroller, that can emulate instruction execution in software. This may be used, for example, for executing less common instructions, to avoid having to provide appropriately dedicated hardware units able to execute such less common instructions natively.

The execution unit of the data processor can be any suitable and desired execution unit that can execute instructions in a program to be executed by the data processor.

The execution unit is operable to fetch and decode instructions for execution using the hardware unit or units (and comprises appropriate instruction fetch and instruction decode circuits/circuitry for that purpose).

The instruction fetch circuit/circuitry and process can operate in any suitable and desired manner, such as, and in an embodiment, in the normal manner for the data processor in question. In an embodiment, the instructions are fetched for execution by the execution unit from an instruction cache, and thus the data processor in an embodiment also comprises an appropriate instruction cache.

The technology described herein can be used for any suitable and desired program that a data processor may execute. Thus, in the case of a graphics processor, for example, the technology described herein may be used for shader program execution, for example.

In an embodiment, the program that is being executed is a command stream that is being used to control the operation of the data processor, for example, and in an embodiment, to configure and trigger processing tasks on the data processor. In this case, the program being executed will be in the form of a "command stream" that will, in an embodiment, be executed by an appropriate execution unit (a command stream execution unit) on the data processor.

A command stream may, for example, contain commands (instructions) to set parameters for processing jobs (which commands may, e.g. be emulated by a supervising controller on the data processor), as well as commands (instructions) to execute the processing jobs, e.g. using the data processor hardware units. The command stream execution unit can then work its way through the command stream, executing the commands (instructions) in the command stream, in turn, and performing, or causing the data processor hardware to perform, the operations indicated by the commands.

The "command stream" execution unit will correspondingly support typical control plane instructions, such as arithmetic, load/store and control flow instructions, but also data processing instructions relating to control of the data processor, e.g. to configure and trigger data processor processing tasks. So, when a command stream is executing in an error state according to the technology described herein only the control plane instructions within the command stream(s) are executed.

Thus, in an embodiment, the program that is being executed by the execution unit comprises a command stream for controlling operation of and on the data processor, and the execution unit comprises a command stream execution unit of the data processor.

In this case, the data processor is in an embodiment a graphics processor that is controlled through the execution of command streams, but the technology described herein could equally be used for other data processors whose operation is controlled through the execution of command streams, if desired.

The command stream will be a sequence of instructions (commands) to be executed by a "command stream" execution unit, which execution unit, will, in response to the instructions be operable to perform, for example, operations relating to control of the data processor, for example to configure and trigger processing tasks on the data processor.

Correspondingly, the controller processing unit (if present) in this case in an embodiment comprises a controller processing unit associated with the command stream execution unit, such as, and in an embodiment, a microcontroller (MCU) associated with the command stream execution unit, and that is, e.g., and in an embodiment, operable to emulate in software (at least) certain types of instructions that may be included in a command stream (rather than those instructions being executed directly on hardware functional units associated with the command stream execution unit). Other arrangements would, of course, be possible.

The data, e.g. graphics, processor of the technology described herein will be and is in an embodiment part of an overall data, e.g. graphics, processing system that will include, e.g., and in an embodiment, a host processor that, e.g., executes applications that require processing by the data processor. The host processor will send appropriate commands and data to the data processor to control it to perform data processing operations and to produce data processing output required by applications executing on the host processor. To facilitate this, the host processor should, and in an embodiment does, also execute a driver for the data processor, e.g. and a compiler or compilers for compiling programs to be executed by the programmable stage(s) executed by the data processor. The compiler may, e.g., be part of the driver operation.

The driver thus in an embodiment builds and submits the operations to the queue(s). In an embodiment, the driver also includes the error barrier instructions in the queue(s).

The data, e.g. graphics, processor and/or data processing system, may also comprise, and/or be in communication with, one or more memories and/or memory devices that store the data described herein, and/or the output data generated by the data processor, and/or store software for performing the processes described herein. The data processor may also be in communication with a host microprocessor, and/or with a display for displaying images based on the data generated by the data processor.

Where the data processor is a graphics processor, then as well as any programmable processing (shader) stages, the graphics processor may also implement any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a data processor may be used to generate, such as in the case of a graphics processor, frames for display, render-to-texture outputs, etc. The output data from the data processing is in an embodiment exported to external, e.g. main, memory, for storage and use.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements of the technology described herein may comprise a suitable processor or processors, controller or controllers, functional units, circuitry, circuits, processing logic, microprocessor arrangements, etc., that are operable to perform the various functions, etc., such as appropriately dedicated hardware elements (circuits/circuitry) and/or programmable hardware elements (circuits/circuitry) that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuits/circuitry, etc., if desired.

It will also be appreciated by those skilled in the art that all of the described embodiments of the technology described herein can, and in an embodiment do, include, as appropriate, any one or more or all of the optional features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program comprising computer software code for performing the methods herein described when the program is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions fixed on a tangible, non-transitory medium, such as for example, diskette, CD-ROM, ROM, RAM, flash memory, or hard disk. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

An embodiment of the technology described herein will now be described in the context of a graphics processing unit whose operation is controlled and triggered through the use of command streams. However, it will be appreciated that the technology described herein may generally find utility in any data processing system that includes programmable processors that execute program instructions to perform processing operations.

Thus, for the graphics processor of the present embodiment, the submission of processing work to the graphics processor is controlled using command streams (which are essentially machine code programs that can be executed by a special processor). The graphics processor is thus provided with a command stream frontend including a dedicated processing unit, a 'command stream execution unit', for interpreting and implementing the command streams.

Processing work for the graphics processor is thus specified by the host processor generating a suitable sequence of commands for implementation by the graphics processor. The host processor accordingly comprises a suitable command stream generating circuit (or circuitry) (in the form of a driver) operable to prepare, in response to a request for processing to be performed by the graphics processor from an application being executed by the host processor, one or more command stream(s) to cause the graphics processor to perform processing tasks for the application, each command stream including a sequence of commands for implementation by the graphics processor. The command stream generating circuit(/circuitry) acts to translate calls for processing from (applications running on) the host processor into a sequence of commands (instructions) for implementation by the graphics processor.

In the present embodiment, the sequence of commands making up a command stream is stored in an appropriate buffer or buffers. Where plural buffers are used for a command stream, they are all in an embodiment considered to be part of the same command stream (and share the same register file and other state).

The command stream buffers are stored in main (system) memory, but commands therefrom (their contents) can be prefetched/cached (e.g. in local storage of the graphics processor) when the command stream is being/is to be executed, to aid execution throughput.

In order to execute the command streams, the graphics processor is provided with a suitable command stream execution circuit/circuitry (generally referred to herein as a 'command stream frontend'). The command stream frontend (circuit/circuitry) may generally comprise one or more command stream interface(s) and a command stream execution unit.

The (and each) command stream interface is operable to cause the graphics processor to execute a respective command stream that has been assigned to that command stream interface. Thus, a (and each) command stream interface can have associated with it (assigned to it) a command stream buffer storing a sequence of commands (a command stream) to be implemented.

When a command stream is to be prepared and executed, a respective command stream interface is in an embodiment allocated (assigned to) that command stream.

Each command stream interface in an embodiment also comprises (has associated with it) a local memory and registry to which state values (parameters) for the processing jobs can be stored. Thus, parameters for processing jobs can be set and stored locally for each command stream interface (e.g. without having to include the state parameters explicitly in the job descriptors provided by the host processor).

The command stream frontend (circuit/circuitry) also includes a command stream execution unit for implementing the commands. The command stream execution unit is thus operable to fetch commands from the one or more command buffers (that are currently assigned to a command stream interface) and to then interpret and execute those commands.

In general, any number of command stream interfaces may be provided, as desired. For instance, in some embodiments, a plurality of (e.g. two) command stream interfaces are provided. In such cases, where a plurality of command stream interfaces are provided, the command stream execution unit may, for example, process commands for the respective command stream interfaces in an alternating (e.g. round robin) fashion.

The graphics processor also includes an appropriate supervising controller, e.g. in the form of a microcontroller, that is operable to handle the scheduling of the command streams on the hardware execution resources of the graphics processor. The supervising microcontroller controls the operation of the command stream frontend, including assigning command streams to respective command stream interfaces, etc.

Some commands in a command stream will be implemented natively in hardware in the graphics processor. Others may be emulated in software by the controller. Thus, when a command in a command stream is executed, e.g. by the command stream execution unit, the instruction (or processing work) associated with that command may be implemented either in hardware or emulated by the controller. This will typically depend on the type of the command that is being executed.

For example, a command stream may contain a series of 'MOVE' commands for loading parameter values into the local memory or registry associated with that command buffer to initialise or modify the state vector. These commands can be executed in turn by the command stream execution unit in order to set the parameters for the processing job. These types of command are in an embodiment implemented natively, e.g. using appropriate command stream execution unit hardware.

The command stream execution unit is also operable to schedule processing work to be performed by the graphics processor hardware units. For example, a 'RUN' command may be executed wherein processing work is sent to the graphics processor hardware for processing. A RUN command is effectively a processing job but with the initial state (parameters) (in an embodiment) being obtained from the local memory or registry (e.g. rather than being explicitly incorporated as a job descriptor). These commands are thus implemented (natively) in the graphics processor hardware.

The hardware units of the graphics processor (and that are associated with the execution unit) in this regard may typically comprise one or more iterator(s) and one or more (in an embodiment a plurality of) processing core(s). Thus, when processing work is sent to the graphics processor hardware units, e.g. when executing a RUN command, the processing job may be sent, along with the initial state (parameters), to a respective iterator. An iterator takes the processing job and splits it up into a number of processing tasks which can then be issued to the processing core(s). The iterator can also track the completion of the processing tasks.

The iterators may be bound to a particular command stream interface. That is, each command stream interface may be associated with, and only able to submit processing jobs to, a particular set of one or more iterators. These bindings can be defined and controlled (dynamically) by the controller.

Other types of commands e.g. that are less frequent, of a more complex nature, that can be expected to have some delay, and/or that may need to wait on an external entity, may be emulated in software by the controller.

In general, any desired number of commands streams can be prepared for the graphics processor. Each command stream may relate to any suitable and desired processing work. Where multiple command streams are prepared, each command stream may relate to a different or the same type of processing task.

Figure 3:
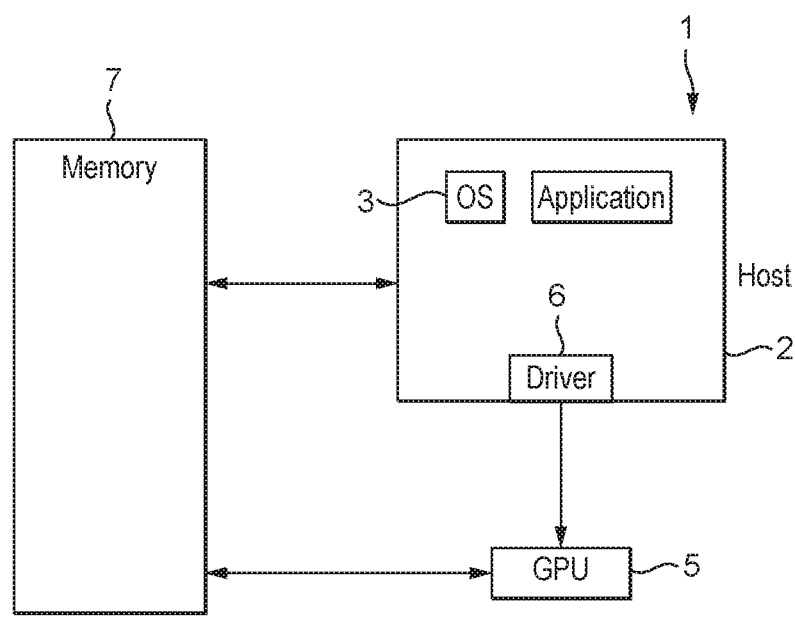
FIG. 3 shows an exemplary graphics processing system according to embodiments of the technology described herein.
Figure 4:
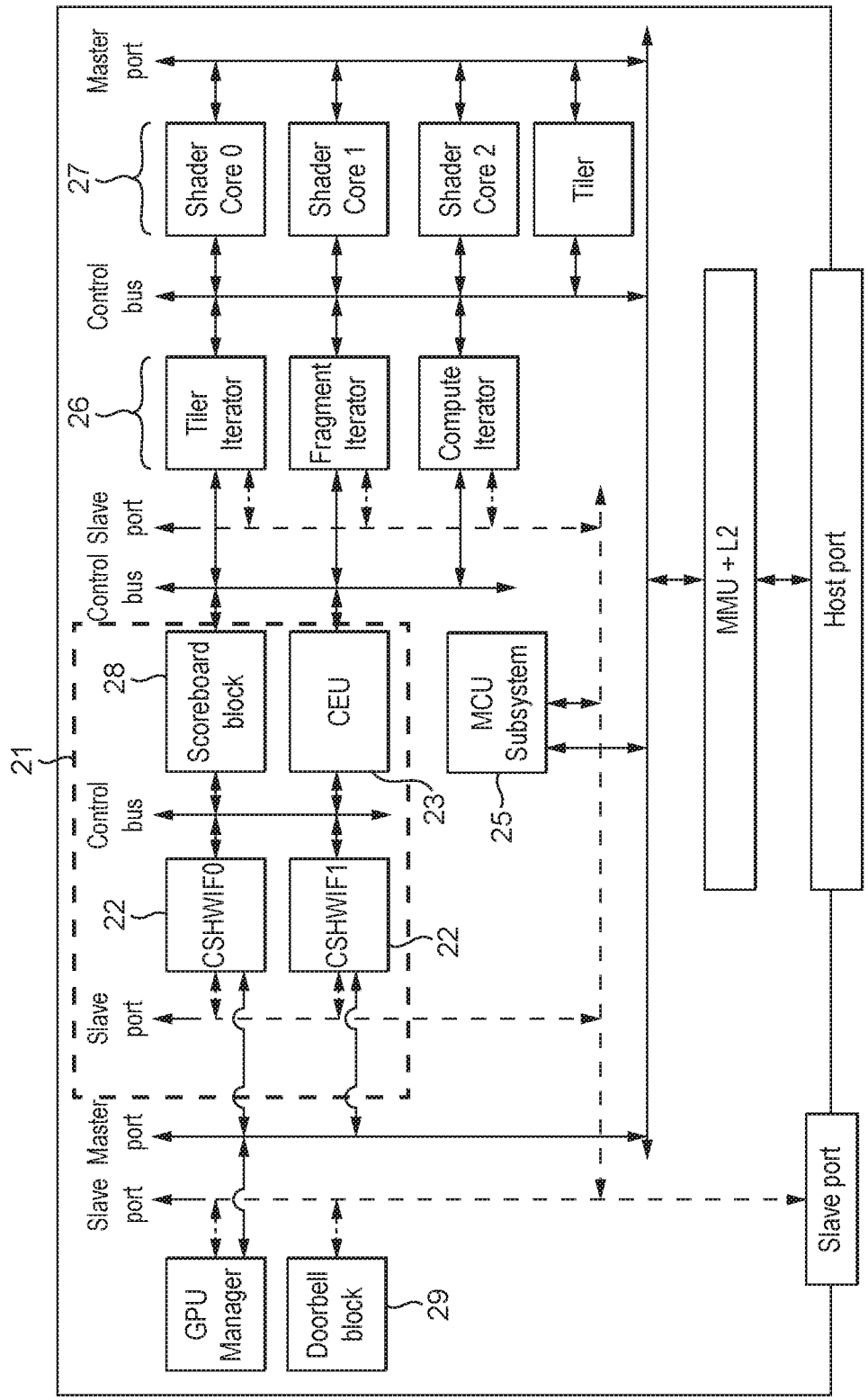
FIG. 4 shows schematically in more detail a graphics processor (including a command stream frontend) that can be operated in the manner of the technology described herein.
Figure 5:
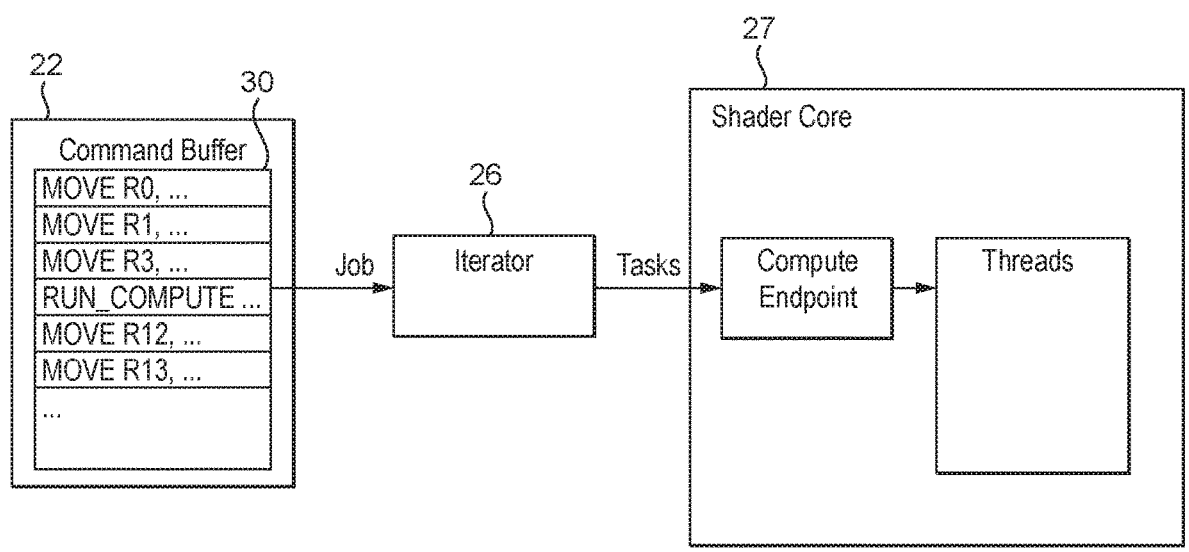
FIG. 5 shows schematically how a command stream may be executed using a graphics processor like that shown in FIG. 4.

FIGS. 3 to 5 show this arrangement and operation of the graphics processor in the present embodiments in more detail.

FIG. 3 shows an exemplary data processing system 1 that may, for instance, comprise an embedded data processing system for use, for example, in a portable electronic device, such as a mobile phone or tablet. The data processing system includes a host processor (CPU) 2 on which an operating system (OS) 3, and one or more applications 4 may execute, and a memory 7.

The data processing system also includes an associated graphics processing unit (GPU) 5 that can perform graphics processing operations for the applications 4 and the operating system 3 executing on the host processor 2. To facilitate this, the host processor 2 also executes a driver 6 for the GPU 5. For instance, an application 4 such as a game executing on the host processor 2 may various require graphics processing operations to be performed by the GPU 5. To do this, the application will generate API (Application Programming Interface) calls that are interpreted by the driver 6 to generate appropriate commands for the GPU 5 to generate the graphics output required by the application 4.

Particularly, the driver 6 is operable to generate a set of "commands" to be provided to the GPU 5 in response to requests from the application 4 running on the host processor 2 for graphics output (e.g. to generate a frame to be displayed). In the present embodiments, the appropriate commands and data for performing the processing tasks required by the application 4 are provided to the GPU 5 in the form of one or more command stream(s), that each include a sequence of commands (instructions) for causing the graphics processor to perform desired processing tasks.

The command streams are prepared by the driver 6 on the host processor 2 and may, for example, be stored in appropriate command stream buffers in the memory 7, from where they can then be read into the GPU 5 for execution. Each command stream may contain commands (instructions) to set parameters for graphics processor tasks, as well as commands (instructions) to execute a task, etc.

The GPU 5 thus includes a command stream frontend for receiving and interpreting these command streams and to control job submission for the GPU 5.

FIG. 4 shows in more detail the GPU 5 including the command stream frontend 21. The command stream frontend 21 is generally operated under the control of a supervising microprocessor (MCU) 25, which handles communications with the host processor 2, and schedules the processing of active command streams on the command stream frontend 21.

The command stream frontend 21, which may be implemented as a single (hardware) functional unit, generally comprises one or more command stream interfaces 22 and a (shared) command stream execution unit 23. Each command stream interface 22 has an associated command buffer containing a set of active instructions to be processed, as well as a registry and local memory for storing the internal state (parameters) for the processing. The command buffer is contained in system memory with the command stream interface containing its properties so it can obtain commands from it.

The instructions within the command buffer(s) are provided to the command stream execution unit 23 and then executed in turn (e.g. in a round robin fashion where multiple command stream interfaces 22 are provided). The command stream execution unit 23 thus executes the commands in turn, with the instructions either being emulated in software by the MCU 25, or assigned to the accelerator hardware, e.g. depending on the type of instruction.

(In general when the command stream execution unit 23 executes an instruction, it will either perform the operation synchronously itself (e.g. a move operation), or it will "package up" a request and send it to the GPU hardware units in the case of (e.g. a run command), or it will inform the supervising MCU 25, which may then emulate the command in software.)

The command stream frontend 21 also includes a scoreboard block 28 that is able to independently track the processing job completion for each of the command steam interfaces 22. The scoreboard block 28 is thus a shared resource. The scoreboard block 28 tracks the progress of the processing tasks associated with each processing job and reports this back.

As shown in FIG. 4, the GPU 5 includes a number of hardware units, such as a plurality of iterators 26 (here, separate tiler, fragment and compute iterators are provided, although other arrangements would of course be possible) and processing (e.g. shader) cores 27.

A processing job specified in a command being executed by the command stream execution unit 23 can thus be assigned and sent to a respective iterator 26, along with the current parameters held within the registry and local memory. The iterator 26 acts to break down the processing job into a set of processing tasks which can then be distributed between the processing cores 27 for processing.

The host processor 2 communicates with the MCU 25 of the GPU 5 via a shared interface memory (which may be main memory, or another suitable memory cache, depending on the configuration). Thus, when an application 4 running on the host processor 2 makes a call for processing by the GPU 5, the host processor 2 can communicate with the MCU 25 of the GPU 5 via the shared memory, and the MCU can then read the data in from the shared memory. For instance, the host processor 2 can write to a doorbell block 29 to interrupt the current operation of the MCU 25 and cause the MCU 25 to handle new work.

Once the MCU 25 receives a request from the host processor 2 to execute a command stream, the MCU 25 can then assign a respective command stream interface 22 for the command stream, and the command stream can then be loaded into a command buffer for the assigned interface (and the command stream properties written to the assigned interface). The commands are then passed in order from the command buffer to the command stream execution unit 23 which interprets the commands from the command buffers, and executes the commands using the local memory and registry information associated with that command stream interface and buffer.

When a command is executed by the command stream execution unit 23, depending on the type of instruction, the instruction may then be performed either in hardware (e.g. by the command stream execution unit 23 itself, or using the iterators 26 and shader cores 27), or may be emulated by the MCU 25. For instance, any commands e.g. for updating the local memory and registry information may typically be implemented by the command stream execution unit 23 itself in order to set the parameters for a processing job. The processing job may then be sent to the GPU hardware unit(s) for processing, along with these parameters.

FIG. 5 illustrates the execution of a command stream within a system like that shown in FIG. 4. The command stream in the command buffer 30 includes a sequence of instructions of different types, including e.g. 'MOVE' and 'RUN' commands. The MOVE commands, for example, load constants into the local memory or registry on the command stream interfaces in order to initialise or modify the state vectors for a processing job. The 'RUN' command then sends the state vector to an iterator 26 to start the processing job iteration. Various other types of commands may also be used, for instance, a 'LOAD' command may be implemented to bulk read from/write to system memory. A 'WAIT' command may also be implemented to cause the processing to wait for the completion of any asynchronous (e.g. RUN or LOAD) commands.

MOVE commands will be implemented within the command stream execution unit 23. LOAD and WAIT commands (and also "synchronisation" commands) will typically be emulated in firmware by the MCU 25.

The RUN commands are implemented in the hardware units of the GPU. Thus, as shown in FIG. 5, when a RUN command is executed, a processing job is then sent to the respective iterator 26 (along with the state vector whose value has been initialised in the previous commands). The iterator 26 then breaks the processing job into smaller processing tasks which are then issued to the shader core(s) 27. Each shader core may comprise an endpoint that is able to take a task and issue it to thread groups within the shader core. The iterators 26 may be bound to a particular command stream interface 22 before starting an asynchronous command.

The present embodiments relate in particular to the operation of the GPU 5 shown in FIGS. 3 and 4 when executing a command stream such as that illustrated in FIG. 5, and in particular to the more graceful handling of errors encountered within the queue(s) of command streams. The GPU 5 may have one or more queues (an in-order collection of operations) to which operations prepared by the host processor 2 are queued/submitted for execution. For instance, the host application 4 and the driver 6 are typically building and queuing/submitting work to the GPU 5 a number of frames ahead of where the GPU 5 is currently executing.

The operations within a queue (command stream) are independent but may provide input into other works items in the queue, and indeed on other queues which could be in the same or a different device which could be a different type of device (e.g. CPU, display controller, video decoder, etc.). These dependencies form part of the operation and can be considered to be part of the "control flow" part of the operation. The part of the operation which does the data processing can be considered the "data processing" part of the operation. A single operation may have multiple "data processing" and "control flow" parts to it.

An operation which requires input data from another work item can be said to have a "data dependency".

An operation which merely requires to be executed after another work item can be said to have an "order dependency".

An operation which inherits control state from another operation can also be said to have an "order dependency".

Often there is a natural break in the "data dependency" of operations, such as a frame boundary in a graphics processing context. At this point any errors which occurred during previous operation(s) execution are no longer relevant.

During the execution of a "data processing" part of an operation an error may happen meaning the data processing is incomplete. In this case, any other "data processing" operations within the operation which generated the error, or any other operations which have a "data dependency" on the operation which generated an error, should not be run as they may now have invalid input (which can cause further errors or even device lockups).

In order to handle such errors, in the present embodiment an "error state" is added for each queue on a device. This is in an embodiment done for all (queue based) devices for which form part of the system. A queue can thus be considered to have two execution modes: its normal execution mode, wherein both data processing and control plane operations are executed; and an error execution mode wherein only control plane operations are executed. The "error state" for a queue is set when the GPU 5 encounters an error during the "data processing" part(s) of an operation.

As work in one queue can depend on work from another queue (and potentially from another device) this error state is also able to be passed between queues. This is in an embodiment done using the same dependency (synchronisation) mechanism which is used to order work between the queues. Some of the dependencies between queues might be "data dependencies" while others might be "order dependencies" so the extension to the dependency mechanism allows the passing of the error state to be optional so this can be represented. Thus, a queue can also "inherit" the error state from another queue through synchronisation.

The error state for a queue can be cleared, e.g. on reset/enabling of the queue, to return the GPU 5 to its normal execution mode. To facilitate this operation, the driver 6 is configured to include error barriers within a queue that are arranged such that when an error barrier is encountered during the execution of a queue it will clear the "error state" of the queue.

During the building of operations the driver 6 will decide when to insert an error barrier within each queue. This will typically be at the end of a render pass or frame, for example, where there is a natural break in the processing dependencies. During the building of the operations when synchronisation operations are added for synchronising operations between different queues the driver 6 will also decide whether or not the error state of a queue (the error state when the operation is executed) should be inherited by another queue. This information can then be included by modifying the existing synchronisation signal instructions within the queues. For instance, when a synchronisation signal instruction is executed within a first queue, the error state for that queue can then be selectively propagated to any other queue(s) that are waiting on the processing of that queue. The decision as to whether or not the error state is inherit may be controlled by the host processor adding suitable logic into the instructions within the first queue, e.g. by a modification the synchronisation signal instruction. Alternatively, this logic may be included within the waiting queue(s). This may be the case in embodiments when there are multiple waiting queues and only some of these should inherit the error state.

During execution when the "error state" is active on a queue then all "data processing" part(s) of an operation(s) are ignored (they become 'NOP' instructions) on that queue to avoid attempting to process work which has known bad input. The "control flow" part(s) of the operation(s) however continue to be executed on the queue. This could include global hardware state configuration or synchronisation operations used to block execution of operation(s) until work in other queues have completed and/or signal that operations in other queues can execute as they are unblocked.

Figure 6:
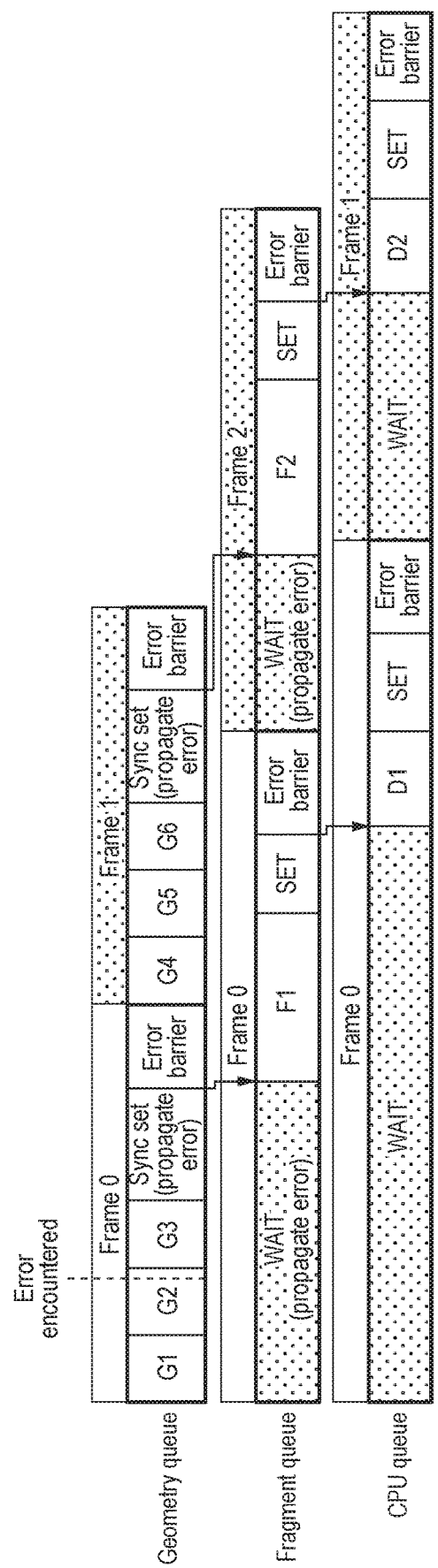
FIG. 6 schematically illustrates the operation of a data processor according to an embodiment of the technology described herein.

FIG. 6 provides a visual representation of how three different queues are built and how the error barrier and error propagation through synchronisation can be used. FIG. 6 shows three queues and the dependencies between these queues are indicated by the arrows (pointing from the queue which was blocking to the queue which was blocked). In principle the data processing system may have any number of queues with any suitable dependencies, including multiple or selective dependencies between queues.

In particular, FIG. 6 shows an example of a graphics processing system including a geometry processing queue, a fragment processing queue and a CPU queue. The execution in each of these queues in this example will now be explained for illustrative purposes.

The geometry processing queue is initially executing a series of pipelined geometry processing operations, G1, G2, . . . , etc., corresponding to a first frame (Frame 0). Geometry processing operation G1 completes without error but an error is encountered during the execution of geometry processing operation G2, in response to which the error state is set for the geometry processing queue (with the setting of the queue into the error state potentially being performed selectively by the host processor, e.g. after confirming with the host processor that the queue should indeed be set into the error state, using a suitable handshake). The next geometry processing operation for the first frame G3 is thus fully executed in error execution mode.

The fragment processing queue is waiting on the geometry processing queue. So, once all of the geometry processing operations for the first frame have been executed, a sync set instruction in the geometry processing queue is then executed to allow the fragment processing queue to begin executing the fragment processing operations F1 for the first frame.

After this, the geometry processing queue reaches, and executes, the error barrier instruction, which clears the error state for the geometry processing queue so that the geometry processing operations G4, G5, . . . , etc. for the next frame (Frame 1) can then be executed in the normal processing state.

In this example, the sync set instruction in the geometry processing queue is configured to inherit the error state from the queue into the sync and to propagate the error state of the geometry processing queue to the fragment processing queue. (So, when the next sync set in the geometry processing queue is executed, because the queue is no longer in the error state, the error state of the sync will be cleared.)

The fragment processing queue wait is blocked on execution of the sync set in the geometry processing queue after the final geometry processing operation for the first frame G3 is executed. When the sync wait for the fragment processing queue is unblocked, because the sync has inherit the error state from the geometry processing queue, and because the wait in this example is configured to inherit the error from the sync to the queue, the fragment processing queue is then also set into an error state meaning that any data plane operations in fragment processing operation F1 will not be executed. The sync set in the fragment processing queue is not configured to inherit the error state and so when the sync set in the fragment processing queue is executed the error state of the sync will be cleared. The error barrier instruction in the fragment processing queue is then executed which clears the error state of the queue. The following fragment processing operations (for the next frame) then execute in normal execution mode.

The CPU queue wait is blocked on the sync after F1. When the sync wait unblocks the sync has a clear error state, but in any case the wait is not configured to inherit error state from the sync so the queue remains in its normal processing state. The CPU operation D1 and the sync set operation thus execute in the normal processing state, followed by the error barrier (which does nothing, as the queue is not in an error state). The remaining operations in the CPU queue continue to execute in normal mode.

It will be appreciated that FIG. 6 shows just one example of how error states may be inherited/propagated between different queues but that in other examples the inheritance/propagation for any of the queues may be configured in any suitable manner, as desired. That is, and in general, the inheritance of error states can be determined either by the sync set instructions or the sync wait instructions or indeed in any other suitable manner.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology described herein and its practical applications, to thereby enable others skilled in the art to best utilise the technology described herein, in various embodiments and with various modifications as are suited to the particular use contemplated. It is intended that the scope be defined by the claims appended hereto.

The invention claimed is:

1. A method of controlling a data processor to perform data processing operations, comprising:
    preparing at a host processor one or more queue(s) of operations for execution by the data processor, each operation comprising a set of one or more instruction(s),
    each queue having a normal processing state and an error state, wherein while in the error state the data processor does not implement any instructions in the queue that may have a data dependency on another operation in the queue(s) such that those instructions require input data from the processing of the other operation,
    wherein the preparing the one or more queue(s) of operations includes, including in one or more of the queue(s) one or more error barrier instructions that divide the respective queue(s) into plural sets of operations;
    providing the queue(s) of operations to the data processor for execution; and
    the data processor executing the queue(s) of operations, wherein the executing the queue(s) of operations comprises:
    in response to an error in the processing of an operation for one of the one or more queue(s), setting that queue of operations into an error state;
    processing the queue of operations in the error state by not executing any instructions that may have a data dependency on another operation;
    clearing the error state for the queue when the processing reaches the next error barrier instruction in the queue so that the next operation(s) in that queue can be processed by the data processor in its normal processing state; and
    resuming the processing of the next operation(s) in the queue in the normal processing state.

2. The method of claim 1, wherein the setting of a queue into an error state in response to an error in the processing of an operation in the queue is performed selectively by the host processor.

3. The method of claim 1, comprising setting a queue of operations into an error state in response to receiving an indication that another queue is in an error state.

4. The method of claim 3, wherein the host processor includes one or more instruction(s) within the queue(s) to determine whether or not a queue of operations should be set into an error state in response to receiving an indication that another queue is in an error state.

5. The method of claim 3, wherein the data processor is executing at least a first queue and a second queue, wherein the second queue has to wait upon the processing of the first queue, the method comprising setting the second queue into an error state in response to receiving an indication that the first queue is in its error state.

6. The method of claim 5, wherein the processing of the second queue waits until a synchronisation signal instruction is executed in the first queue, and wherein the synchronisation signal instruction is configured to propagate an error signal to the second queue.

7. The method of claim 5, wherein the processing of the second queue waits until a synchronisation signal instruction is executed in the first queue, and wherein an instruction included in the second queue determines whether or not an error signal from the first queue is propagated.

8. A method of operating a data processor when executing a program including one or more queue(s) of operations to be executed by the data processor, each operation comprising a set of one or more instruction(s),
wherein each queue of operations includes one or more error barrier instructions dividing the queue into plural sets of operations, and
wherein the data processor is operable to set a queue of operations into an error state in response to an error in the processing of an operation for one of the one or more queue(s), wherein while in the error state the data processor does not implement any instructions in the queue that may have a data dependency on another operation in the queue(s) such that those instructions require input data from the processing of the other operation,
the method comprising:
setting a queue of operations into an error state in response to an error in the processing of an operation for the queue;
processing the queue of operations in the error state by not executing any instructions that may have a data dependency on another operation;
clearing the error state for the queue when the processing reaches the next error barrier instruction in the queue so that the next operation(s) in that queue can be processed by the data processor in its normal processing state; and
resuming the processing of the next operation(s) in the queue in the normal processing state.

9. A data processing system, the data processing system comprising a host processor and a data processor that is operable to perform data processing operations under the control of the host processor, wherein:
the host processor comprises:
a driving circuit for preparing one or more queue(s) of operations for execution by the data processor, each operation comprising a set of one or more instruction(s),
wherein the driving circuit is configured to include in the one or more queue(s) of operations one or more error barrier instructions that divide the respective queue(s) into plural sets of operations; and wherein the data processor comprises:
an execution unit for executing instructions in the one or more queue(s), the data processor being operable to process a queue in a normal processing state or in an error state, wherein while in the error state the data processor does not implement any instructions in the queue that may have a data dependency on another operation in the queue(s) such that those instructions require input data from the processing of the other operation; and
an error handling circuit that is operable to set a queue of operations into an error state in response to an error in the processing of an operation for one of the one or more queue(s) so that the queue of operations is processed in the error state by not executing any instructions that may have a data dependency on another operation, and
to then clear the error state for the queue when the execution unit reaches the next error barrier instruction in the queue so that the next operation(s) in the queue can be processed by the execution unit in its normal processing state.

10. The data processing system of claim 9, wherein the decision of setting of a queue into an error state in response to an error in the processing of an operation in the queue is performed selectively by the host processor.

11. The data processing system of claim 9, wherein the error handling circuit is configured to set a queue of operations into an error state in response to receiving an indication that another queue is in an error state.

12. The data processing system of claim 11, wherein the driving circuit of the host processor is configured to include one or more instruction(s) within the queue(s) to determine whether or not a queue of operations should be set into an error state in response to receiving an indication that another queue is in an error state.

13. The data processing system of claim 11, wherein the data processor is executing at least a first queue and a second queue, wherein the second queue has to wait upon the processing of the first queue, and wherein the error handling circuit is configured to set the second queue into an error state in response to receiving an indication that the first queue is in its error state.

14. The data processing system of claim 13, wherein the processing of the second queue waits until a synchronisation signal instruction is executed in the first queue, and wherein the synchronisation signal instruction is configured to propagate an error signal to the second queue.

15. The data processing system of claim 13, wherein the processing of the second queue waits until a synchronisation signal instruction is executed in the first queue, and wherein an instruction included in the second queue determines whether or not an error signal from the first queue is propagated.

16. A data processor, the data processor comprising:
an execution unit for executing instructions in a program to be executed by the data processor; and
an error handling circuit that is operable to set a queue of operations into an error state in response to an error in the processing of an operation for one of one or more queue(s), wherein while in the error state the data processor does not implement any instructions in the queue that may have a data dependency on another operation in the queue(s) such that those instructions require input data from the processing of the other operation, the data processor being configured such that:
when the execution unit is executing a program comprising one or more queue(s) of operations, each operation comprising a set of one or more instruction(s), and each queue of operations including one or more error barrier instructions dividing the queue into plural sets of operations, the error handling circuit is configured to:
set a queue of operations into an error state in response to an error in the processing of an operation of the queue of operations so that the queue of operations is processed in the error state without executing any instructions that may have a data dependency on another operation, and to then clear the error state for the queue when the execution unit reaches the next error barrier instruction in the queue so that the next operation(s) in the queue can be processed by the execution unit in its normal processing state.

17. A non-transitory computer readable storage medium storing software code that when executed on a data processor performs a method of operating a data processor when executing a program including one or more queue(s) of operations to be executed by the data processor, each operation comprising a set of one or more instruction(s), wherein each queue of operations includes one or more error barrier instructions dividing the queue into plural sets of operations, and wherein the data processor is operable to set a queue of operations into an error state in response to an error in the processing of an operation for one of the one or more queue(s), wherein while in the error state the data processor does not implement any instructions in the queue that may have a data dependency on another operation in the queue(s) such that those instructions require input data from the processing of the other operation, the method comprising:

setting a queue of operations into an error state in response to an error in the processing of an operation for the queue;

processing the queue of operations in the error state by not executing any instructions that may have a data dependency on another operation;

clearing the error state for the queue when the processing reaches the next error barrier instruction in the queue so that the next operation(s) in that queue can be processed by the data processor in its normal processing state; and resuming the processing of the next operation(s) in the queue in the normal processing state.

* * * * *